US011624829B2

(12) United States Patent
Dasika et al.

(10) Patent No.: US 11,624,829 B2
(45) Date of Patent: Apr. 11, 2023

(54) SYSTEM AND METHOD FOR DETERMINING SOIL CLOD SIZE DISTRIBUTION USING SPECTRAL ANALYSIS

(71) Applicant: CNH Industrial America LLC, New Holland, PA (US)

(72) Inventors: Surya Saket Dasika, Pittsburgh, PA (US); Michael R. Cozza, Pittsburgh, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 770 days.

(21) Appl. No.: 16/568,819

(22) Filed: Sep. 12, 2019

(65) Prior Publication Data
US 2021/0080586 A1  Mar. 18, 2021

(51) Int. Cl.
*G01S 17/89* (2020.01)
*G06T 7/11* (2017.01)
(Continued)

(52) U.S. Cl.
CPC .............. *G01S 17/89* (2013.01); *A01B 63/22* (2013.01); *A01B 79/005* (2013.01);
(Continued)

(58) Field of Classification Search
CPC .... G06K 7/10574; G06V 10/10; G06V 20/00; G06V 20/693; G06V 40/376;
(Continued)

(56) References Cited

U.S. PATENT DOCUMENTS 3,675,769 A * 7/1972 Story ................... B07B 13/00
209/587
6,570,999 B1   5/2003 Monson
(Continued)

FOREIGN PATENT DOCUMENTS

RU   2631088 C1   9/2017

OTHER PUBLICATIONS

Cheng et al., "Applying two-dimensional Fourier Transform to investigate soil surface porosity by laser-scanned data", Soil & Tillage Research 124 (2012), pp. 183-189.*
(Continued)

*Primary Examiner* — Guillermo M Rivera-Martinez
(74) *Attorney, Agent, or Firm* — Rebecca Henkel; Rickard Demille

(57) ABSTRACT

In one aspect, a system for determining soil clod size distribution as an agricultural implement is being towed across a field by a work vehicle may include a vision-based sensor provided in operative association with one of the work vehicle or the agricultural implement. As such, the vision-based sensor may be configured to capture vision data associated with a portion of the field present within a field of view of the vision-based sensor. Furthermore, the system may include a controller configured to receive vision data from the vision-based sensor. Moreover, the controller may be further configured to analyze the received vision data using a spectral analysis technique to determine a size distribution of soil clods present within the field of view of the vision-based sensor.

18 Claims, 5 Drawing Sheets

(51) Int. Cl.
  *A01B 63/22* (2006.01)
  *A01B 79/00* (2006.01)
  *A01D 34/28* (2006.01)
  *A01D 41/127* (2006.01)

(52) U.S. Cl.
  CPC ....... *A01D 34/283* (2013.01); *A01D 41/1273* (2013.01); *G06T 7/11* (2017.01)

(58) Field of Classification Search
  CPC .................. G06V 10/143; G06V 10/25; G06T 2207/30188; G06T 7/73; G06T 1/0007
  See application file for complete search history.

(56) References Cited

U.S. PATENT DOCUMENTS

| | | | |
|---|---|---|---|
| 6,853,937 B2 | 2/2005 | Sakae et al. | |
| 8,233,667 B2 | 7/2012 | Helgason et al. | |
| 9,367,921 B2 | 6/2016 | Boardman et al. | |
| 9,401,030 B2 | 7/2016 | Nelan | |
| 9,554,098 B2 | 1/2017 | Casper et al. | |
| 10,123,475 B2 | 11/2018 | Posselius et al. | |
| 10,143,125 B2 | 12/2018 | Schleyer et al. | |
| 2003/0009286 A1* | 1/2003 | Shibusawa | A01B 79/005 702/2 |
| 2015/0224544 A1* | 8/2015 | McGloughlin | B07C 5/342 209/577 |
| 2015/0310633 A1* | 10/2015 | Nelan | G06T 7/0002 382/110 |
| 2016/0029547 A1 | 2/2016 | Casper et al. | |
| 2016/0237640 A1 | 8/2016 | Carpenter et al. | |
| 2017/0090068 A1* | 3/2017 | Xiang | A01B 76/00 |
| 2018/0024050 A1* | 1/2018 | Hollstein | G01N 33/0098 382/103 |
| 2018/0206393 A1* | 7/2018 | Stoller | A01B 35/32 |
| 2018/0352718 A1 | 12/2018 | Kovach et al. | |
| 2019/0021226 A1 | 1/2019 | Dima et al. | |
| 2019/0048556 A1* | 2/2019 | Kasahara | E02D 33/00 |
| 2019/0057461 A1* | 2/2019 | Ruff | G06Q 50/02 |
| 2019/0141880 A1* | 5/2019 | Zemenchik | A01C 21/007 172/1 |
| 2019/0150357 A1* | 5/2019 | Wu | G06T 7/73 |
| 2020/0352088 A1* | 11/2020 | Arnett | A01C 7/203 |

OTHER PUBLICATIONS

Frede, Hans-Georg, et al., "Soil Surface Roughness as the Result of Aggregate Size Distribution 1. Report: Measuring and Evaluation Method," Journal of Plant Nutrition and Soil Science, vol. 158, Issue 1, 1995, pp. 31-35.

Šařec, P., et al., "Laser Profilometer Testing by Laboratory Measurements," Department of Machinery Application, Research in Agricultural Engineering, vol. 53, Issue 1, pp. 1-7.

Thomsen, L.M., et al., "Soil Surface Roughness: Comparing Old and New Measuring Methods and Application in a Soil Erosion Model," Soil, vol. 1, Issue 1, Apr. 24, 2015, pp. 399-410.

Uteau, Daniel, et al., "Aggregate and Soil Clod Colume Measurement: A Method Comparison," Soil Science Society of America Journal, Jan. 2013, 5 pages.

International Search Report and Written Opinion Corresponding to Application No. PCT/US2020/049651 dated Dec. 21, 2020 (11 pages).

* cited by examiner

SYSTEM AND METHOD FOR DETERMINING SOIL CLOD SIZE DISTRIBUTION USING SPECTRAL ANALYSIS

FIELD OF THE INVENTION

The present disclosure generally relates to systems and methods for determining soil clod size distribution and, more particularly, to systems and methods for determining soil clod size distribution of a field across which an implement is being towed by a work vehicle using spectral analysis.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools, such as harrow discs, shanks, leveling discs, tines, rolling baskets, and/or the like, which loosen and/or otherwise agitate the soil to prepare the soil for subsequent planting operations.

Upon completion of the tillage operation, it is generally desirable that the soil clods present on the surface of the field have a predetermined size distribution. In this regard, it may be necessary to adjust one or more operating parameters of the tillage implement during the tillage operation to ensure that the soil clods within the field remain within the predetermined size distribution. However, it may be difficult for the tillage implement operator to accurately determine the soil clod size distribution of the field while performing the tillage operation.

Accordingly, an improved system and method for determining soil clod size distribution would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining soil clod size distribution as an agricultural implement is being towed across a field by a work vehicle. The system may include a vision-based sensor provided in operative association with one of the work vehicle or the agricultural implement such that the vision-based sensor is configured to capture vision data associated with a portion of the field present within a field of view of the vision-based sensor. Furthermore, the system may include a controller communicatively coupled to the vision-based sensor, with the controller including a processor and associated memory. The memory may store instructions that, when implemented by the processor, configure the controller to receive, from the vision-based sensor, vision data associated with the portion of the field present within the field of view of the vision-based sensor. The instructions, when implemented by the processor, may further configure the controller to analyze the received vision data using a spectral analysis technique to determine a size distribution of soil clods present within the field of view of the vision-based sensor.

In another aspect, the present subject matter is directed to a method for determining soil clod size distribution as an agricultural implement is being towed across a field by a work vehicle. The method may include receiving, with one or more computing devices, vision data associated with a portion of the field as the implement is being towed across the field by a work vehicle. Furthermore, the method may include analyzing, with the one or more computing devices, the received vision data using a spectral analysis technique to determine a size distribution of soil clods present within the portion of the field. Additionally, the method may include providing, with the one or more computing devices, a notification to an operator of at least one of the work vehicle or the agricultural implement associated with the determined size distribution of the soil clods.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
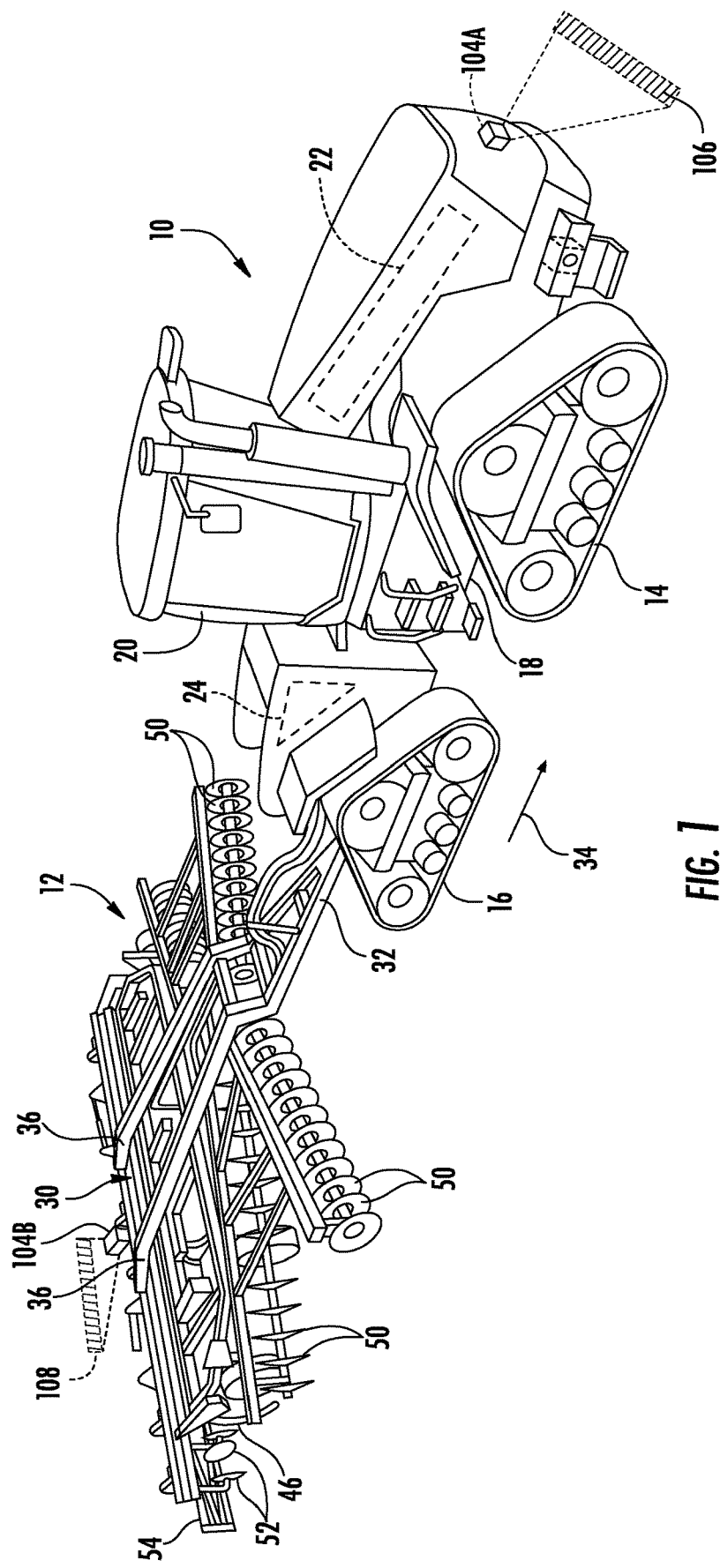
FIG. 1 illustrates a perspective view of one embodiment of a work vehicle towing an implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining soil clod size distribution as an agricultural implement is being towed across a field by a work vehicle. Specifically, in several embodiments, one or more vision-based sensors (e.g., a LIDAR sensor(s)) may be provided in operative association with the work vehicle and/or the implement. In this regard, as the vehicle/implement travels across the field to perform an agricultural operation (e.g., a tillage operation) thereon, the vision-based sensor(s) may be configured to capture vision data of the field (e.g., a plurality of single data point scan lines). The captured vision data may then be analyzed by an associated controller to determine the size distribution of the soil clods present within the field(s) of view of the vision-based sensor(s). For example, in one embodiment, the determined size distribution may be indicative the relative amounts or percentages of small, medium, and large soil clods present within the field. Thereafter, the controller may be configured to adjust one or more operating parameters of the vehicle and/or implement based on the determined size distribution of the soil clods. For example, in one embodiment, the controller may be configured to initiate an adjustment in the force being applied to one or more basket assemblies of the implement when the determined soil clod size distribution falls outside of a predetermined distribution range.

In accordance with aspects of the present subject matter, the controller may be configured to use a spectral analysis technique (e.g., a Fourier transformation technique) to analyze the received vision data. In general, the received vision data may be in the spatial domain such that the data is indicative of the vertical profile of the soil surface of the field at various positions within the field. As such, in several embodiments, the controller may be configured to transform the vision data to the frequency domain. Moreover, the controller may be configured to determine the spectral densities of a plurality of frequencies or frequency ranges associated with the transformed vision data. Thereafter, the controller may be configured to determine the size distribution of the soil clods present within the field(s) of view of the vision-based sensor(s) based on the determined spectral densities.

Figure 2:
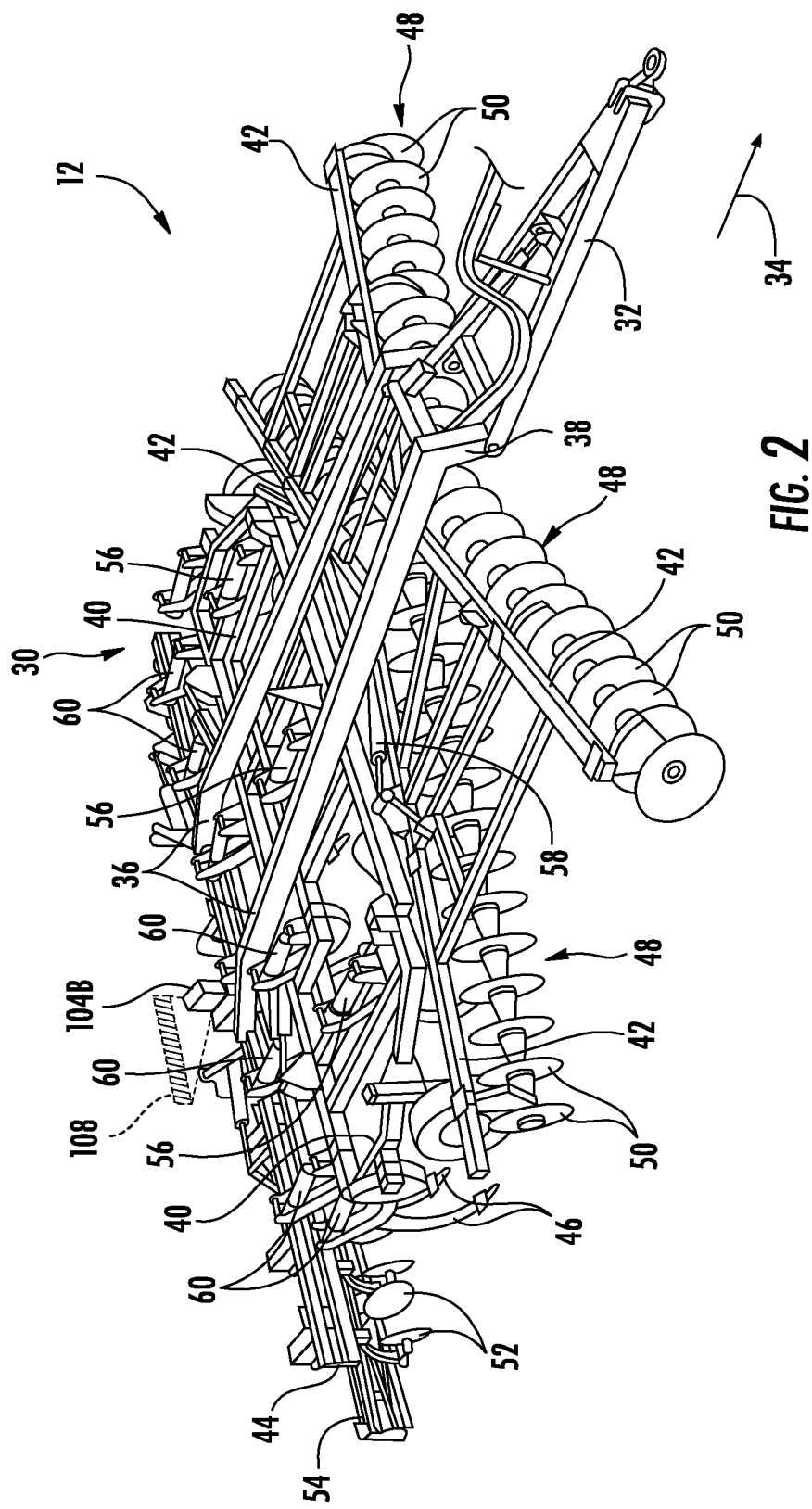
FIG. 2 illustrates a perspective view of the implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor and the implement 12 is configured as a tillage implement. However, in other embodiments, the work vehicle 10 may be configured as any other suitable agricultural vehicle. Furthermore, in alternative embodiments, the implement 12 may be configured as any other suitable agricultural implement.

As particularly shown in FIG. 1, the work vehicle 10 includes a pair of front track assemblies 14, a pair of rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, the work vehicle 10 may include an engine 22 and a transmission 24 mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the work vehicle 10 via a pull hitch or tow bar 32 in a travel direction of the vehicle (e.g., as indicated by arrow 34). In general, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning, penetration depth, and/or down force associated with the various ground-engaging tools 46, 50, 52, 54. For instance, the implement 12 may include one or more first actuators 56 coupled to the central frame 40 for raising or lowering the central frame 40 relative to the ground, thereby allowing the penetration depth and/or the down pressure of the shanks 46 to be adjusted. Similarly, the implement 12 may include one or more second actuators 58 coupled to the disk forward frame 42 to adjust the penetration depth and/or the down pressure of the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12.

Additionally, in accordance with aspects of the present subject matter, the work vehicle 10 and/or the implement 12 may include one or more devices vision-based sensors coupled thereto and/or supported thereon for capturing vision data associated with the field as an operation is being performed via the implement 12. Specifically, in several embodiments, the vision-based sensor(s) may be provided in operative association with the work vehicle 10 and/or the implement 12 such that the vision-based sensor(s) has a field of view directed towards a portion(s) of the field disposed in front of, behind, and/or along one or both of the sides of the work vehicle 10 and/or the implement 12 as the implement 12 is being towed across the field. As such, the vision-based sensor(s) may capture vision data from the vehicle 10 and/or implement 12 of one or more portion(s) of the field being passed by the vehicle 10 and/or implement 12.

In general, the vision-based sensor(s) may correspond to any suitable device(s) configured to capture vision data of the soil surface of the field that allows the profile of the top surface of the field to be identified. For instance, in several embodiments, the vision-based sensor(s) may correspond to a Light Detection and Ranging ("LIDAR") device(s), such as a LIDAR scanner(s). In such embodiments, the vision-based sensor(s) may be configured to output light pulses from a light source (e.g., a laser outputting a pulsed laser beam) and detect the reflection of each pulse off the soil surface. Based on the time of flight of the light pulses, the specific location (e.g., 2-D or 3-D coordinates) of the soil surface relative to the vision-based sensor(s) may be calculated. By scanning the pulsed light over a given swath width, the profile of the soil surface may be detected across a given section of the field. Thus, by continuously scanning the pulsed light along the soil surface as the work vehicle 10 and the implement 12 are moved across the field, a plurality of single data point scan lines may be generated that includes soil surface profile data for all or a portion of the field.

Alternatively, the vision-based sensor(s) may correspond to any other suitable vision vision system(s) that is capable of capturing vision or image-like data that allows the soil surface profile of the field to be identified. For example, in one embodiment, the vision-based sensor(s) may correspond to a camera(s).

In several embodiments, two or more vision-based sensors may be provided in operative association with the work vehicle 10 and/or the implement 12. For instance, as shown in FIGS. 1 and 2, in one embodiment, a first vision-based sensor 104A may be coupled to the front of the work vehicle 10 such that the vision-based sensor 104A has a field of view 106 that allows it to capture vision data of an adjacent area or portion of the field disposed in front of the work vehicle 10. For instance, the field of view 106 of the vision-based sensor 104A may be directed outwardly from the front of the work vehicle 10 along a plane or reference line that extends generally parallel to the travel direction 34 of the work vehicle 10. Similarly, as shown in FIGS. 1 and 2, a second vision-based sensor 104B may be coupled to the rear of the implement 12 such that the vision-based sensor 104B has a field of view 108 that allows it to capture vision data of an adjacent area or portion of the field disposed aft of the implement 12.

It should be appreciated that, in alternative embodiments, the vision-based sensor(s) 104A, 104B may be installed at any other suitable location(s) that allows the vision-based sensor(s) 104A, 104B to capture vision data of the field across which the vehicle/implement 10/12. For example, as an alternative to positioning the first vision-based sensor 104A at the front of the vehicle 10, such vision-based sensor 104A may be coupled to one of the sides of the work vehicle 10 or the implement 12 such that the vision-based sensor 104A has a field of view 106 that allows it to capture vision data of an adjacent area or portion of the field disposed along such side of the work vehicle 10 or the implement 12. Moreover, as an alternative to positioning the second vision-based sensor 104B at the rear of the implement 12, such vision-based sensor 104B may be coupled to other of the sides of the work vehicle 10 or the implement 12 such that the vision-based sensor 104B has a field of view 108 that allows it to capture vision data of an adjacent area or portion of the field disposed along such side of the work vehicle 10 or the implement 12. However, in alternative embodiments, the vision-based sensor(s) 104A, 104B may be mounted at any other suitable location(s) on the vehicle 10 and/or the implement 12.

Additionally, it should be appreciated that, although the embodiments shown in FIGS. 1 and 2 illustrate two vision-based sensors 104A, 104B installed on the work vehicle 10 and/or the implement 12, a single vision-based sensor may be installed relative to the work vehicle 10 and/or the implement 12 to allow vision data of the field to be captured. For instance, in one embodiment, it may be desirable to only have a single vision-based sensor that captures vision data either before or after the agricultural operation is performed. Alternatively, a single vision-based sensor may be used to capture vision data both before and after the agricultural operation is performed. For instance, by making a second pass across the same portion of the field or by mounting the vision-based sensor along the side of the work vehicle 10 or the implement 12, before and after vision data for same section of the field may be captured using a single vision-based sensor. Furthermore, in other embodiments, more than two vision-based sensors may be installed relative to the work vehicle 10 and/or the implement 12 to allow vision data for the field to be captured.

Figure 3:
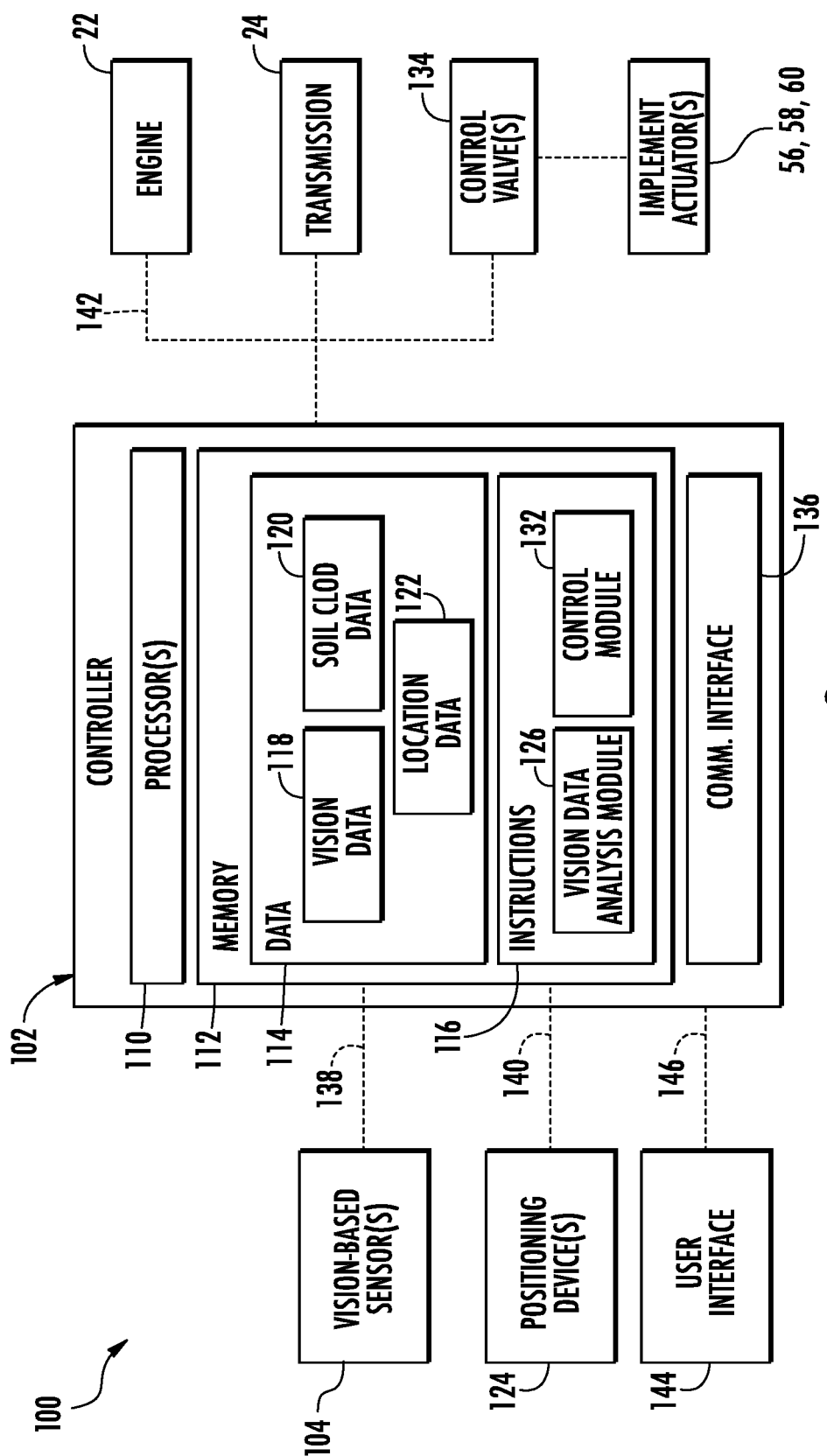
FIG. 3 illustrates a schematic view of one embodiment of a system for determining soil clod size distribution as an agricultural implement is being towed across a field by a work vehicle in accordance with aspects of the present subject matter.

Referring now to FIG. 3, a schematic view of one embodiment of a system 100 for determining soil clod size distribution as an agricultural implement is being towed across a field by a work vehicle is illustrated in accordance with aspects of the present subject matter. In general, the system 100 will be described herein with reference to the work vehicle 10 and the implement 12 described above with reference to FIGS. 1 and 2. However, it should be appreciated by those of ordinary skill in the art that the disclosed system 100 may generally be utilized with work vehicles having any other suitable vehicle configuration and/or implements having any other suitable implement configuration.

In several embodiments, the system 100 may include a controller 102 and various other components configured to be communicatively coupled to and/or controlled by the controller 102, such as one or more vision-based sensors 104 and/or various components of the work vehicle 10 and/or the implement 12. As will be described in greater detail below, the controller 102 may be configured to receive vision data from the vision-based sensor(s) 104 depicting portions of the field as an operation (e.g., a tillage operation) is being performed within the field. For example, as described above, such vision data may correspond to a plurality of single data point scan lines associated with the soil surface profile of the field. Thereafter, the controller 102 may be configured to analyze the received vision data (e.g., using a spectral analysis technique) to estimate or determine the size distribution of the soil clods present on the surface of the field. Moreover, based on the analysis of the vision data, the controller 102 may also be configured to adjust the operation of the work vehicle 10 and/or the implement 12, as necessary, to ensure that the soil clod size distribution of the field is maintained at a given target value and/or within a given target range.

In general, the controller 102 may correspond to any suitable processor-based device(s), such as a computing device or any combination of computing devices. Thus, as shown in FIG. 3, the controller 102 may generally include one or more processor(s) 110 and associated memory devices 112 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a vision database 118 for storing vision data received from the vision-based sensor(s) 104. For example, the vision-based sensor(s) 104 may be configured to continuously or periodically capture vision data (e.g., data point scan lines) of adjacent portion(s) of the field as an agricultural operation is being performed on the field. In such an embodiment, the vision data transmitted to the controller 102 from the vision-based sensor(s) 104 may be stored within the vision database 118 for subsequent processing and/or analysis. It should be appreciated that, as used herein, the term vision data may include any suitable type of data received from the vision-based sensor(s) 104 that allows for the profile of the soil surface of of a field to be analyzed, including data point scan lines/LIDAR scan data and other vision-based or image-like data (e.g., photographs).

Additionally, as shown in FIG. 3, the memory 112 may include a soil clod database 120 for storing information related to the size distribution of the soil clod present on the surface of the field being processed. For example, as indicated above, based on the vision data received from the imaging device(s) 104, the controller 102 may be configured to estimate or determine the size distribution of the soil clods present on the surface of the field using a spectral analysis technique (e.g., a Fourier transformation technique). The soil clod size distribution estimated or determined by the controller 102 may then be stored within the soil clod database 120 for subsequent processing and/or analysis.

Moreover, in several embodiments, the memory 112 may also include a location database 122 storing location information about the work vehicle/implement 10, 12 and/or information about the field being processed (e.g., a field map). Specifically, as shown in FIG. 3, the controller 102 may be communicatively coupled to a positioning device(s) 124 installed on or within the work vehicle 10 and/or on or within the implement 12. For example, in one embodiment, the positioning device(s) 124 may be configured to determine the current location of the work vehicle 10 and/or the implement 12 using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 124 may be transmitted to the controller 102 (e.g., in the form coordinates) and subsequently stored within the location database 122 for subsequent processing and/or analysis.

Additionally, in several embodiments, the location data stored within the location database 122 may also be correlated to the vision data stored within the vision database 118. For instance, in one embodiment, the location coordinates derived from the positioning device(s) 124 and the vision data captured by the vision-based sensor(s) 104 may both be time-stamped. In such an embodiment, the time-stamped data may allow the vision data associated with a given swath or portion of the field captured by the vision-based sensor(s) 104 to be matched or correlated to a corresponding set of location coordinates received from the positioning device(s) 124, thereby allowing the precise location of such swath/portion of the field depicted within the vision data to be known (or at least capable of calculation) by the controller 102.

Moreover, by matching the vision data to a corresponding set of location coordinates, the controller 102 may also be configured to generate or update a corresponding field map associated with the field being processed. For example, in instances in which the controller 102 already includes a field map stored within its memory 112 that includes location coordinates associated with various points across the field, the soil clod size distribution value(s) determined from the vision data captured by the vision-based sensor(s) 104 may be mapped or correlated to a given location within the field map. Alternatively, based on the location data and the associated vision data, the controller 102 may be configured to generate a field map for the field that includes the geo-located vision data associated therewith.

Figure 4:
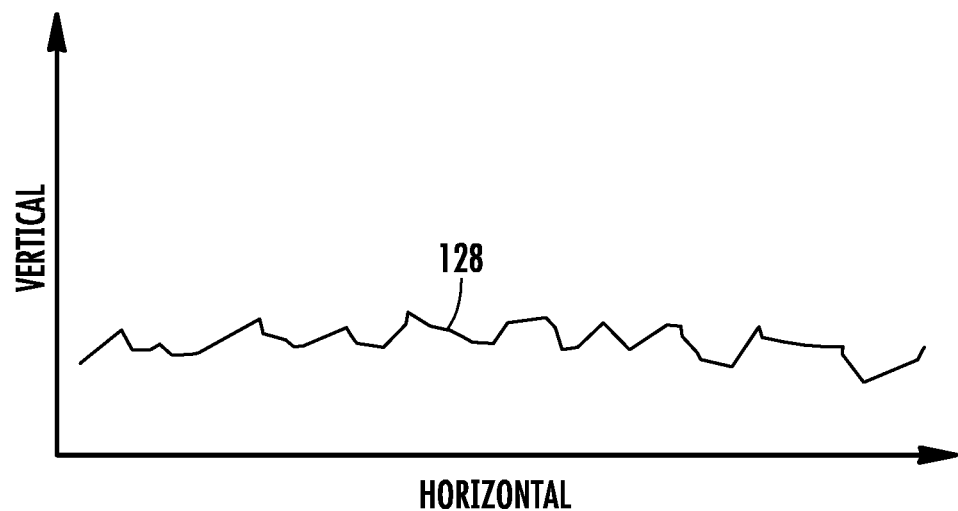
FIG. 4 illustrates an example data plot associated with vision data captured by the system disclosed in FIG. 3, particularly illustrating the surface profile of a portion of a field in the spatial domain.
Figure 5:
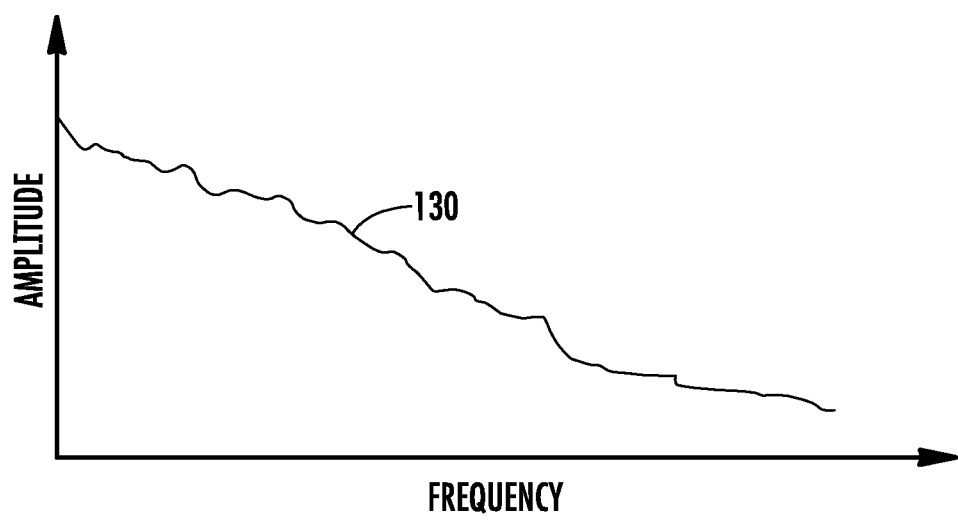
FIG. 5 illustrates another example data plot associated with vision data captured by the system disclosed in FIG. 3, particularly illustrating the surface profile of a portion of a field after the data has been transformed from the spatial domain to the frequency domain.

Referring still to FIG. 3, in several embodiments, the instructions 116 stored within the memory 112 of the controller 102 may be executed by the processor(s) 110 to implement a vision data analysis module 126. In general, the vision data analysis module 126 may be configured to analyze the vision data received from the vision-based sensor(s) 104 using one or more data analysis techniques to allow the controller 102 to estimate or determine the soil clod size distribution of the field currently being processed. More specifically, the received vision data may generally be indicative of the vertical profile of the soil surface at various locations within the field. For example, FIG. 4 illustrates an example data plot generated from the received vision data. As shown, the example data plot depicts the 2-D vertical profile (e.g., as indicated by line 128 in FIG. 4) of the soil surface at various horizontal locations along a portion of the field. Thus, the received vision data may be in the spatial domain. As such, in several embodiments, the vision data analysis module 126 may be configured to implement one or more spectral analysis techniques to allow the controller 102 to transform the received vision data from the spatial domain to the frequency domain. For example, FIG. 5 illustrates an example data plot illustrating the vision data after such data has been transformed using the spectral analysis technique(s). As shown, the example data plot depicts the amplitude (e.g., as indicated by line 130) of the vision data at various frequencies. Furthermore, implementation of the spectral analysis technique(s) by the vision data analysis module 126 may allow the controller 102 to determine the spectral densities for a plurality of frequencies and/or frequency ranges associated with the transformed vision data. In general, the frequencies/frequency ranges having greater spectral densities are more prevalent in the transformed vision data than frequencies/frequency ranges having smaller spectral densities. As will be described below, higher frequencies may be associated with smaller soil clods, while lower frequencies may be associated with larger soil clods. As such, the size distribution of the soil clods (e.g., the relative amounts of small, medium, and large soil clods) present within the field may be calculated or determined based on the spectral densities of the frequencies/frequency ranges associated with the transformed vision data.

It should be appreciated that the vision data analysis module 126 may be configured to implement any suitable spectral analysis techniques that allow the controller 102 to determine the size distribution of the soil clods present on the field from the received vision data. Specifically, in several embodiments, the vision data analysis module 126 may be configured to implement a suitable Fourier transformation technique, such as a Fast Fourier transformation (FFT) technique. For example, suitable FFT techniques may include the Cooley-Tukey, Prime Factor, Braun's, Rader's, Bluestein's, and/or Hexagonal techniques. However, in alternative embodiments, the vision data analysis module 126 may be configured to implement any other suitable spectral analysis techniques, such as the Bartlett's, Welch's, and/or Least-squares techniques.

Additionally, it should be appreciated that the frequencies of the transformed vision data may be used to remove the effects of the residue present on the field surface on the soil clod size determinations. More specifically, in many instances, residue is present on the surface of the field. As such, the profile of the field surface depicted within the vision data may include both the soil clods and the residue present on the field. In general, the higher frequencies are associated with residue than with soil clods. In this respect, the vision data analysis module 126 may allow the controller 102 to remove or ignore the portions of the transformed vision data that are associated with the residue. Thereafter, the remaining data may generally only be indicative of the soil clods present on the field surface.

Referring again to FIG. 3, the instructions 116 stored within the memory 112 of the controller 102 may also be executed by the processor(s) 110 to implement a control module 132. In general, the control module 132 may be configured to adjust the operation of the work vehicle 10 and/or the implement 12 by controlling one or more components of the vehicle/implement 10, 12. Specifically, in several embodiments, the control module 132 may be configured to adjust one or more operating parameters of the vehicle 10 and/or the implement 12 based on the determined size distribution of the soil clods. For example, in one embodiment, when the soil clod size distribution determined by the controller 102 falls outside of a predetermined soil clod size distribution range, the control module 132 may be configured to fine-tune the operation of the work vehicle 10 and/or the implement 12 in a manner designed to adjust the sizes of the soil clods present on the surface of the field. For instance, when it is determined that the soil clod size distribution exceeds a maximum soil clod size distribution threshold (thereby indicating that the soil clods present within the field are too large), the control module 132 may be configured to adjust the operation of the work vehicle 10 and/or the implement 12 to decrease the sizes of the soil clods present within the field.

It should be appreciated that the controller 102 may be configured to implement various control actions to adjust the operation of the work vehicle 10 and/or the implement 12 in a manner that adjusts the sizes of the soil clods present within the field. In one embodiment, the controller 102 may be configured to increase or decrease the operational or ground speed of the implement 12 to affect a decrease in the soil clod sizes. For instance, as shown in FIG. 3, the controller 102 may be communicatively coupled to both the engine 22 and the transmission 24 of the work vehicle 10. In such an embodiment, the controller 102 may be configured to adjust the operation of the engine 22 and/or the transmission 24 in a manner that increases or decreases the ground speed of the work vehicle 10 and, thus, the ground speed of the implement 12, such as by transmitting suitable control signals for controlling an engine or speed governor (not shown) associated with the engine 22 and/or transmitting suitable control signals for controlling the engagement/ disengagement of one or more clutches (not shown) provided in operative association with the transmission 24.

In addition to the adjusting the ground speed of the vehicle/implement 10/12 (or as an alternative thereto), the controller 102 may also be configured to adjust one or more operating parameters associated with the ground-engaging tools of the implement 12. For instance, as shown in FIG. 3, the controller 102 may be communicatively coupled to one or more valves 134 configured to regulate the supply of fluid (e.g., hydraulic fluid or air) to one or more corresponding actuators 56, 58, 60 of the implement 12. In such an embodiment, by regulating the supply of fluid to the actuator(s) 56, 58, 60, the controller 102 may automatically adjust the penetration depth of, the force applied to, and/or any other suitable operating parameter associated with the ground-engaging tools of the implement 12. For example, in one embodiment, when it is determined that the soil clod size distribution has exceeded the maximum soil clod size distribution threshold (thereby indicating that the soil clods present within the field are too large), the controller 102 may be configured to control the valve(s) 134 in a manner that increases the force applied to the basket assemblies 54 by the actuators 60.

Moreover, as shown in FIG. 3, the controller 102 may also include a communications interface 136 to provide a means for the controller 102 to communicate with any of the various other system components described herein. For instance, one or more communicative links or interfaces 138 (e.g., one or more data buses) may be provided between the communications interface 136 and the vision-based sensor(s) 104 to allow vision data transmitted from the vision-based sensor(s) 104 to be received by the controller 102. Similarly, one or more communicative links or interfaces 140 (e.g., one or more data buses) may be provided between the communications interface 136 and the positioning device(s) 124 to allow the location information generated by the positioning device(s) 124 to be received by the controller 102. Additionally, as shown in FIG. 3, one or more communicative links or interfaces 142 (e.g., one or more data buses) may be provided between the communications interface 136 and the engine 22, the transmission 24, the control valves 138, and/or the like to allow the controller 102 to control the operation of such system components.

Furthermore, in one embodiment, the system 100 may also include a user interface 144. More specifically, the user interface 144 may be configured to provide feedback (e.g., feedback associated with the size distribution of the soil clods) to the operator of the vehicle/implement 10/12. As such, the user interface 144 may include one or more feedback devices (not shown), such as display screens, speakers, warning lights, and/or the like, which are configured to provide feedback from the controller 102 to the operator. The user interface 144 may, in turn, be communicatively coupled to the controller 102 via a communicative link or interface 146 to permit the feedback to be transmitted from the controller 102 to the user interface 144. In addition, some embodiments of the user interface 144 may include one or more input devices (not shown), such as touchscreens, keypads, touchpads, knobs, buttons, sliders, switches, mice, microphones, and/or the like, which are configured to receive user inputs from the operator. In one embodiment, the user interface 144 may be mounted or otherwise positioned within the cab 20 of the vehicle 10. However, in alternative embodiments, the user interface 144 may mounted at any other suitable location.

Figure 6:
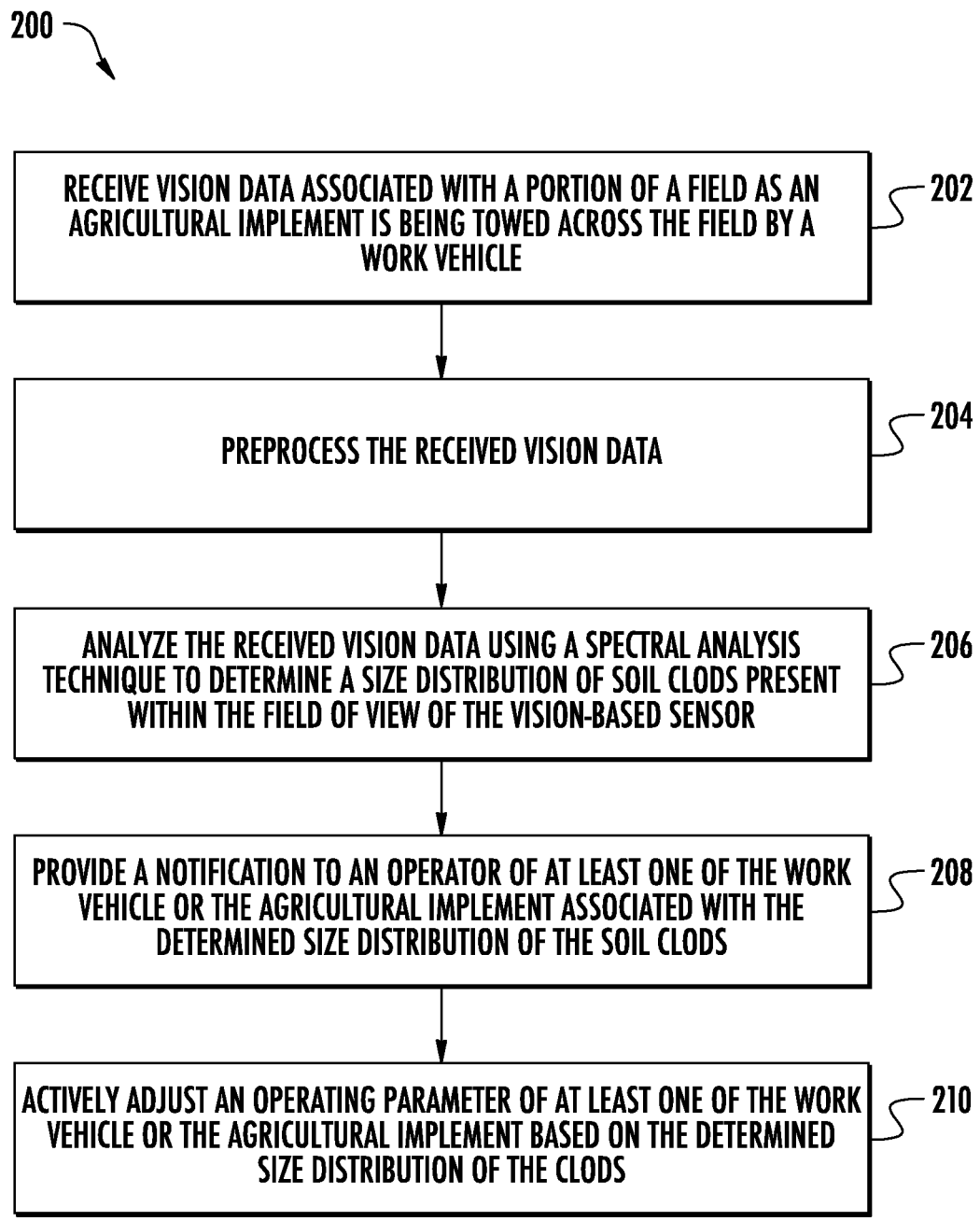
FIG. 6 illustrates a flow diagram of one embodiment of a method for determining soil clod size distribution as an agricultural implement is being towed across a field by a work vehicle in accordance with aspects of the present subject matter.

Referring now to FIG. 6, a flow diagram of one embodiment of a method 200 for determining soil clod size distribution as an implement is being towed across a field by a work vehicle is illustrated in accordance with aspects of the present subject matter. In general, the method 200 will be described herein with reference to the agricultural work vehicle 10 and implement 12 shown in FIGS. 1 and 2, as well as the various system components shown in FIGS. 3-5. However, it should be appreciated that the disclosed method 200 may be implemented with work vehicles having any other suitable vehicle configuration, implements having any other suitable implement configuration, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include receiving vision data associated with a portion of a field as an implement is being towed across the field by a work vehicle. As described above, the vehicle/implement 10/12 may include one or more vision-based sensor(s) 104 (e.g., a LIDAR sensor(s)), with each vision-based sensor 104 configured to capture vision data (e.g., data plurality of data point scan lines) of a portion of the field within its field of view 106/108. In this regard, as the vehicle/implement 10/12 travels across the field to perform an agricultural operation thereon (e.g., a tillage operation), the controller 102 may be configured to receive the captured vision data from the vision-based sensor(s) 104 (e.g., via the communicative link 138). As will be described below, the controller 102 may be configured to analyze the received vision data to determine the size distribution of the soil clods present within the field.

In some embodiments, the vision data received at (202) may be a plurality of single data point scan lines (e.g., the vertical profile of a 2-D swath of the field associated with the scan line). Thus, in some embodiments, the method 200 may be performed iteratively for each new data scan line as such scan line cloud is received. For example, method 200 may be performed iteratively in real-time as new data scan lines are received from the vision-based sensor(s) 104, while the vision-based sensor(s) 104 are moved throughout the field (e.g., as a result of being installed on the vehicle 10 or the implement 12). Alternatively, the vision data received at (202) may include a data point cloud associated with a 3-D portion of the field (e.g., from a vision-based sensor 102 capable of scanning a 3-D portion of the field).

Furthermore, at (204), the method 200 may include pre-process the received vision data. Specifically, in several embodiments, the vision data analysis module 126 of the controller 102 may be configured to preprocess or otherwise precondition the received vision data. For example, such preprocessing may include removing outliers from the vision data, detrending the vision data, and/or the like. Moreover, in some embodiments, the preprocessing performed at (204) may be specific to the particular spectral analysis technique(s) being used.

Additionally, as shown in FIG. 6, at (206), the method 200 may include analyzing the received vision data using a spectral analysis technique to determine a size distribution of soil clods present within the portion of the field. Specifically, as indicated above, the vision data analysis module 126 of the controller 102 may, in accordance with aspects of the present subject matter, be configured to implement one or more suitable spectral analysis techniques (e.g., a Fourier transformation technique) that allow the controller 102 to determine a size distribution of soil clods present within the of the field based on the received (and preprocessed) vision data. Specifically, in several embodiments, by implementing the spectral analysis technique(s), the controller 102 may be configured to transform the received vision data from the spatial domain to the frequency domain and determine the spectral densities for a plurality of frequencies and/or frequency ranges associated with the transformed vision data. In general, the frequencies/frequency ranges having greater spectral densities are more prevalent in the transformed vision data than frequencies/frequency ranges having smaller spectral densities. Furthermore, higher frequencies may be associated with smaller soil clods, while lower frequencies may be associated with larger soil clods. As such, in one instance, when the spectral densities of higher frequencies of the transformed data are greater than the spectral densities of lower frequencies of the transformed data, there may generally more smaller soil clods present within the field than larger soil clods. In this respect, the controller 102 may be configured to determine the size distribution of the soil clods present within the field based on the determined spectral densities of a plurality of frequencies/frequency ranges of the transformed vision data.

In several embodiments, at (206), the method 200 may include determining the amounts of small, medium, and large soil clods present on the field. As mentioned above, higher frequencies may be associated with smaller soil clods, while lower frequencies may be associated with larger soil clods. In this regard, a first frequency range may be associated with the small clods, a second frequency range greater than the first frequency range may be associated with the medium clods, and a third frequency range greater than the second frequency range may be associated with the large clods. As such, the vision data analysis module 126 may be configured to implement the spectral analysis technique(s) to allow the controller 102 to determine the spectral densities associated with the first, second, and third frequencies ranges. Thereafter, based on the determined spectral densities, the controller 102 may be configured to determine the relative amounts (e.g., the percentage) of small, medium, and large soil clods present on the field.

Moreover, at (208), the method 200 may include providing a notification to the operator of the vehicle/implement associated with the determined size distribution of the soil clods. Specifically, the controller 102 may configured to transmit instructions to the user interface 144 (e.g., the communicative link 146). Such instructions may, in turn, instruct the user interface 144 to provide a notification to the operator of the vehicle/implement 10/12 (e.g., by causing a visual or audible notification or indicator to be presented to the operator) that provides an indication that determined size distribution of the soil clods present within the field. In such instances, the operator may then choose to initiate any suitable corrective action he/she believes is necessary to adjust the soil clod size distribution (to the extent such control action(s) is necessary), such as adjusting the ground speed of the implement 12.

In addition, at (210), the method 200 may include actively adjusting an operating parameter of the work vehicle and/or the implement based on the determined size distribution of the soil clods. Specifically, in several embodiments, the control module 132 of the controller 102 may be configured to adjust one or more operating parameters of the vehicle 10 and/or the implement 12, such as ground speed of the vehicle/implement 10/12 and or the force(s) applied to the ground-engaging tool(s) (e.g., the basket assemblies 54) of the implement 12, in a manner that adjusts the size distribution of the soil clods within the field. For example, in one embodiment, the controller 102 may be configured to compare the determined size distribution of the soil clod to a predetermined maximum clod size distribution. Thereafter, when the determined size distribution of the soil clods exceeds the predetermined maximum clod size distribution (thereby indicating that soil clods are too large), the control module 132 may be configured to adjust the operating parameter(s) of the vehicle 10 and/or the implement 12 in a manner that reduces the size(s) of the soil clod(s) within the field It is to be understood that the steps of the method 200 are performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining soil clod size distribution as an agricultural implement is being towed across a field by an agricultural vehicle, the system comprising:
    a vision-based sensor provided in operative association with one of the agricultural vehicle or the agricultural implement such that the vision-based sensor is configured to capture vision data associated with a portion of the field present within a field of view of the vision-based sensor; and
    a controller communicatively coupled to the vision-based sensor, the controller configured to:
        receive, from the vision-based sensor, the vision data associated with the portion of the field present within the field of view of the vision-based sensor; and
        analyze the received vision data using a spectral analysis technique to determine a size distribution of soil clods present within the field of view of the vision-based sensor.

2. The system of claim 1, wherein, when analyzing the received vision data, the controller is further configured to determine a spectral density of a frequency range associated with the vision data.

3. The system of claim 2, wherein, when analyzing the received vision data, the controller is further configured to determine the size distribution of the soil clods based on the determined spectral density.

4. The system of claim 1, wherein the spectral analysis technique comprises a Fourier transformation technique.

5. The system of claim 1, wherein the size distribution of the soil clods comprises a first amount of the soil clods within a first size range and a second amount of the soil clods within a second size range, the second size range being larger than the first size range.

6. The system of claim 1, wherein the controller is further configured to provide a notification to an operator of at least one of the agricultural vehicle or the agricultural implement associated with the determined size distribution of the soil clods.

7. The system of claim 1, wherein the controller is further configured to actively adjust an operating parameter of at least one of the agricultural vehicle or the agricultural implement based on the determined size distribution of the soil clods.

8. The system of claim 7, wherein the operating parameter comprises at least of a ground speed of the agricultural vehicle or a force being applied to a ground-engaging tool of the agricultural implement.

9. The system of claim 8, wherein the vision-based sensor comprises a light detection and ranging (LIDAR) sensor.

10. The system of claim 1, wherein the vision-based sensor is installed on the agricultural implement such that the field of view of the vision-based sensor is directed towards a portion of the field aft of the agricultural implement relative to a direction of travel of the agricultural implement.

11. A method for determining soil clod size distribution as an agricultural implement is being towed across a field by a agricultural vehicle, the method comprising:
receiving, with one or more computing devices, vision data associated with a portion of the field as the agricultural implement is being towed across the field by the agricultural vehicle;

analyzing, with the one or more computing devices, the received vision data using a spectral analysis technique to determine a size distribution of soil clods present within the portion of the field; and providing, with the one or more computing devices, a notification to an operator of at least one of the agricultural vehicle or the agricultural implement associated with the determined size distribution of the soil clods.

12. The method of claim 11, wherein analyzing the received vision data comprises determining, with the one or more computing devices, a spectral density of a frequency range associated with the transformed vision data.

13. The method of claim 12, wherein analyzing the received vision data further comprises determining, with the one or more computing devices, the size distribution of the soil clods based on the determined spectral density.

14. The method of claim 11, wherein the transformation technique comprises a Fourier transformation technique.

15. The method of claim 11, wherein the size distribution of the soil clods comprises a first amount of the soil clods within a first size range and a second amount of the soil clods within a second size range, the second size range being larger than the first size range.

16. The method of claim 11, further comprising:
actively adjusting, with the one or more computing devices, an operating parameter of at least one of the agricultural vehicle or the agricultural implement based on the determined size distribution of the soil clods.

17. The method of claim 16, wherein the operating parameter comprises at least one of a ground speed of the agricultural vehicle or a force being applied to a ground-engaging tool of the agricultural implement.

18. The method of claim 11, wherein the vision data comprises light detection and ranging (LIDAR) data.

* * * * *